(12) United States Patent
Pan et al.

(10) Patent No.: US 8,798,014 B2
(45) Date of Patent: Aug. 5, 2014

(54) DATA TRANSMISSION METHOD AND DEVICE IN CARRIER AGGREGATION SYSTEM

(75) Inventors: Xueming Pan, Beijing (CN); Zukang Shen, Beijing (CN); Yanan Lin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/131,906

(22) PCT Filed: Jul. 2, 2012

(86) PCT No.: PCT/CN2012/078031
§ 371 (c)(1),
(2), (4) Date: Jan. 10, 2014

(87) PCT Pub. No.: WO2013/007152
PCT Pub. Date: Jan. 17, 2013

(65) Prior Publication Data
US 2014/0140251 A1 May 22, 2014

(30) Foreign Application Priority Data
Jul. 11, 2011 (CN) .......................... 2011 1 0193333

(51) Int. Cl.
*H04W 72/04* (2009.01)
(52) U.S. Cl.
CPC ........ *H04W 72/048* (2013.01); *H04W 72/0446* (2013.01); *H04W 72/0453* (2013.01)
USPC ........... 370/336; 370/321; 370/337; 370/345; 370/347; 370/442; 370/536

(58) Field of Classification Search
USPC .......... 370/321, 336, 337, 345, 347, 442, 536
See application file for complete search history.

(56) References Cited

U.S. PATENT DOCUMENTS

2012/0257554 A1 * 10/2012 Kim et al. .................... 370/280
2012/0327821 A1 * 12/2012 Lin et al. ...................... 370/280

FOREIGN PATENT DOCUMENTS

| CN | 101741710 A | 6/2010 |
| CN | 102118801 A | 7/2011 |

(Continued)

OTHER PUBLICATIONS

International Search Report and Written Opinion for PCT/CN2012/078031 (Chinese).

(Continued)

*Primary Examiner* — Hoon J Chung
(74) *Attorney, Agent, or Firm* — Kilpatrick Townsend & Stockton LLP (57) ABSTRACT

Disclosed are a data transmission method and device in a carrier aggregation system, used for realizing the data transmission of UE which does not support uplink and downlink transmission simultaneously in a carrier aggregation system which uses different TDD uplink and downlink configurations. The data transmission method in a carrier aggregation system provided in the present application includes: an eNB performing data transmission with specific user equipment (UE) according to the time division duplex (TDD) uplink and downlink sub-frame configuration employed by a specific component carrier in a carrier aggregation system by means of a component carrier in the carrier aggregation system, wherein said specific UE is TDDUE which does not support simultaneously performing uplink data transmission and downlink data transmission in an identical sub-frame.

20 Claims, 6 Drawing Sheets

(56) References Cited

FOREIGN PATENT DOCUMENTS

| | | |
|---|---|---|
| CN | 102255718 A | 11/2011 |
| WO | 2010048178 A1 | 4/2010 |

OTHER PUBLICATIONS

English translation of Written Opinion.

\* cited by examiner

DATA TRANSMISSION METHOD AND DEVICE IN CARRIER AGGREGATION SYSTEM

The present application is a US National Stage of International Application No. PCT/CN2012/078031, filed Jul. 2, 2012, designating the United States, and claiming priority to Chinese Patent Application No. 201110193333.7, filed with the State Intellectual Property Office of PRC on Jul. 11, 2011 and entitled "Data communication method and apparatus in carrier aggregation system", the contents of which are hereby incorporated by reference in their entirety.

FIELD

The present invention relates to the field of communications and particularly to a data communication method and apparatus in a carrier aggregation system.

BACKGROUND

Inter-band carrier aggregation is performed in a Release 11 (Rel-11) Long Term Evolution (LTE) system, and in order to avoid interference with an adjacent carrier Time Division Duplex (TDD) system in a different band, an LTE cell in the different band may perform Carrier Aggregation (CA) using a different TDD uplink and downlink sub-frame configuration. For a TDD CA User Equipment (UE) with a low capability, its simultaneous uplink and downlink operation over different carriers, for example, simultaneous reception of downlink data over a Component Carrier (CC) 1 and transmission of uplink data over a CC 2 in the same sub-frame, can not be supported.

The technology of carrier aggregation will be introduced below.

Figure 1:
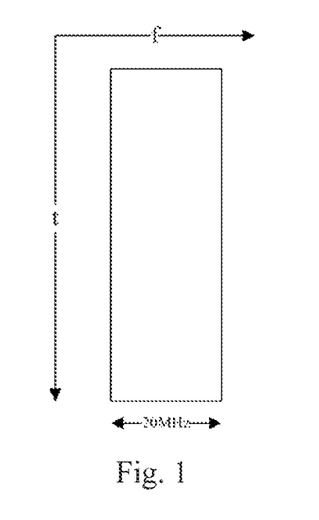
FIG. 1 is a schematic diagram of carrier distribution in an LTE cell.

In wireless communication systems of the LTE and earlier, there is only one carrier in a cell, and there is a maximum bandwidth of 20 MHz in the LTE system, as illustrated in FIG. 1.

Figure 2:
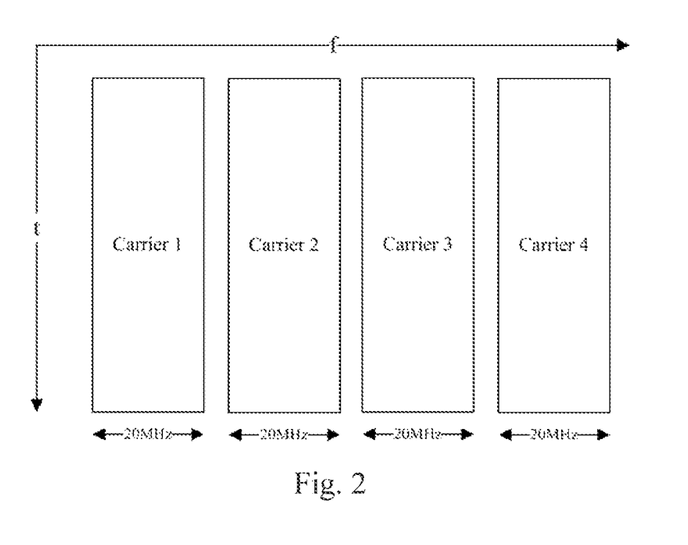
FIG. 2 is a schematic diagram of CA in the LTE-A.

In a Long Term Evolution-Advanced (LTE-A) system, there are required peak rates of the system up to downlink 1 Gbps and uplink 500 Mbps significantly improved over the LTE system. The required peak rates can not be achieved by only a carrier with a maximum bandwidth of 20 MHz. Thus the LTE-A system has to extend the bandwidth available to the user equipment, and in view of this, the technology of carrier aggregation has been introduced where a plurality of consecutive or inconsecutive carriers under the same evolved NodeB (eNB) are aggregated together to serve the UE simultaneously and provide the required rates. These aggregated carries are also referred to as component carriers. Each cell may be a component carrier, and cells (member carriers) under different eNBs can not be aggregated. In order to ensure the UE of the LTE to be capable of operating over each aggregated carrier, the maximum bandwidth of each carrier is no more than 20 MHz. The CA technology of the LTE-A is as illustrated in FIG. 2 where there are four carriers that can be aggregated under an LTE-A eNB, and the eNB can communicate data with the UE simultaneously over the four carriers to improve the throughout of the system.

In the LTE system, there is a radio frame of 10 ms and a sub-frame of 1 ms in both FDD and TDD schemes. For each TDD radio frame, seven TDD uplink and downlink sub-frame configurations are defined as depicted in Table 1:

TABLE 1

| Uplink and downlink sub-frame configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Where D represents a downlink (DL) sub-frame, U represents an uplink (UL) sub-frame, and S represents a special sub-frame of the TDD system, for example, the sub-frames are configured as DSUUDDSUUD in the case of the configuration 1.

For the LTE TDD system, the UE may feed back, in an uplink sub-frame, acknowledgement (ACK) or non-acknowledgement (NACK) information corresponding to a plurality of downlink sub-frames, that is, after demodulating and decoding data in a downlink sub-frame n−k, the UE feeds back in an uplink sub-frame n, to the eNB, signaling (that is, ACK/NACK information) of whether to retransmit the data in the downlink sub-frame, k∈K, K: $\{k_0, k_1, \ldots k_{M-1}\}$, where the values of the set K depend upon an uplink and downlink configuration of the system and a particular sub-frame number as depicted in Table 2:

TABLE 2

| Uplink and downlink sub-frame configuration | Sub-frame number (n) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Here a plurality of radio frames are arranged sequentially, that is, if the last sub-frame in a radio frame a is k, then the first sub-frame in a radio frame a+1 is k+1, and Table 2 depicts K corresponding to each uplink sub-frame by way of an example with only one radio frame, where n−k<0 represents a downlink sub-frame in a preceding radio frame.

In the existing carrier aggregation system, the UE feeds back UL ACK/NACK at the foregoing timing in each aggregated cell, and the corresponding feedback is performed in a primary cell (PCell).

For transmission of uplink data, the eNB needs to transmit in the downlink an ACK/NACK feedback, which is carried over a Physical Hybrid Automatic Repeat Request (HARQ) Indicator Channel (PHICH). For a Frequency Division Duplex (FDD) system, uplink and downlink sub-frames coexist, that is, there is a PHICH resource per sub-frame, so there is a relatively fixed timing relationship between the downlink ACK/NACK feedback and the corresponding uplink data, where ACK/NACK feedback information corresponding to uplink data in the n-th sub-frame is transmitted in the (n+4)-th downlink sub-frame. For a TDD system, there are different numbers of uplink and downlink sub-frames in different TDD sub-frame configurations, such a case may arise that ACK/NACK feedback information of a plurality of uplink sub-frames are transmitted in the same downlink sub-frame, where ACK/NACK feedback information corresponding to uplink data in the n-th sub-frame is transmitted in the (n+k)-th downlink sub-frame, and the value of k is as depicted in Table 3:

TABLE 3

| TDD uplink and downlink sub-frame configuration | Uplink sub-frame number (n) | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In existing carrier aggregation, the UE receives DL ACK/NACK information at the foregoing timing in each aggregated cell, and the corresponding feedback is received over the PHICH channel in the cell in which a UL grant scheduling a Physical Uplink Shared Channel (PUSCH) is transmitted.

Figure 3:
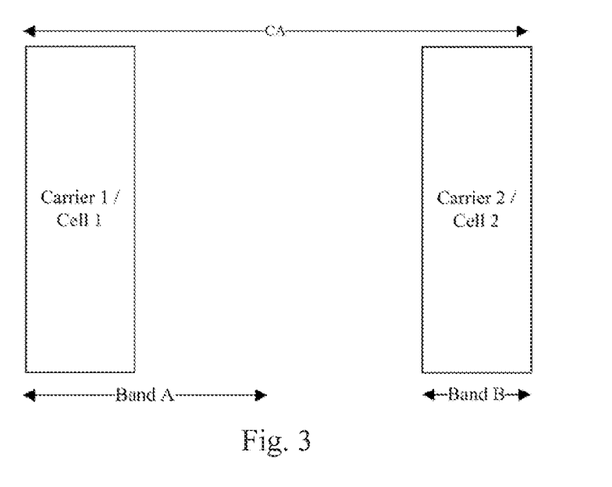
FIG. 3 is a schematic diagram of different TDD uplink and downlink sub-frame configurations in different bands aggregated for an LTE-A CA UE.
Figure 4:
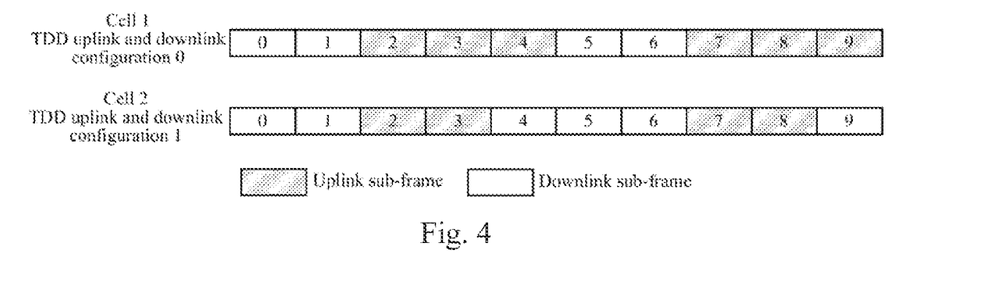
FIG. 4 is a schematic diagram of two cells aggregated in the TDD configuration 0 and the TDD configuration 1.

In the system of the LTE Rel-11 or later, in order to avoid interference with another TDD system, there is such network deployment that different TDD uplink and downlink sub-frame configurations may be used in a plurality of LTE cells in different bands as illustrated in FIG. 3 where a carrier 1 is in a band A, and a carrier 2 is in a band B, and a cell 1 and a cell 2 are cells respectively over the carrier 1 and the carrier 2. A TDD uplink and downlink sub-frame configuration of the cell 1 is the configuration 0, and a TDD uplink and downlink sub-frame configuration of the cell 2 is the configuration 1 different from that of the cell 1. If the UE intends to perform carrier aggregation for these two cells, then such a case may arise that there are different TDD uplink and downlink configurations of the aggregated cells for the UE as illustrated in FIG. 4, and this network deployment scheme using different TDD configurations may result in inconsistent transmission directions of different cells in the same sub-frame, for example, the sub-frame 4 and the sub-frame 9 illustrated in FIG. 4 are uplink sub-frames in the cell 1 and downlink sub-frames in the cell 2. For some UE with a low capability, a capability to operate simultaneously in a plurality of cells may be absent in such sub-frames.

In summary, there has been no solution so far in the prior art to how the UE incapable of supporting simultaneous uplink and downlink transmission communicates data in the carrier aggregation system using different TDD uplink and downlink configurations.

SUMMARY

Embodiments of the invention provide a data communication method and apparatus in a carrier aggregation system so as to enable a UE incapable of supporting simultaneous uplink and downlink transmission to communicate data in the carrier aggregation system using different TDD uplink and downlink configurations.

An embodiment of the invention provides a data communication method in a carrier aggregation system, including:

an eNB communicating data with a specific User Equipment, UE, over component carriers in the carrier aggregation system using a Time Division Duplex, TDD, uplink and downlink sub-frame configuration adopted for a specific component carrier in the carrier aggregation system, wherein the specific UE is a TDD UE incapable of supporting simultaneous uplink data transmission and downlink data transmission over different component carriers in the same sub-frame.

An embodiment of the invention provides another data communication method in a carrier aggregation system, including:

a User Equipment, UE, communicating data with an eNB over component carriers in the carrier aggregation system using a Time Division Duplex, TDD, uplink and downlink sub-frame configuration adopted for a specific component carrier in the carrier aggregation system, wherein the specific UE is a TDD UE incapable of supporting simultaneous uplink data transmission and downlink data transmission over different component carriers in the same sub-frame.

An embodiment of the invention provides a data communication apparatus in a carrier aggregation system, including:

a sub-frame configuration determining component configured to determine a Time Division Duplex, TDD, uplink and downlink sub-frame configuration adopted for a specific component carrier in the carrier aggregation system; and a data communication processing component configured to communicate data with a specific User Equipment, UE, over component carriers in the carrier aggregation system using the Time Division Duplex, TDD, uplink and downlink sub-frame configuration adopted for the specific component carrier in the carrier aggregation system;

wherein the specific UE is a UE incapable of supporting simultaneous uplink data transmission and downlink data transmission over different component carriers in the same sub-frame.

An embodiment of the invention provides another data communication apparatus in a carrier aggregation system, including:

a sub-frame configuration determining component configured to determine a Time Division Duplex, TDD, uplink and downlink sub-frame configuration adopted for a specific component carrier in the carrier aggregation system; and a data communication processing component configured to communicate data with an eNB over component carriers in the carrier aggregation system using the Time Division Duplex, TDD, uplink and downlink sub-frame configuration adopted for the specific component carrier in the carrier aggregation system;

wherein the specific UE is a UE incapable of supporting simultaneous uplink data transmission and downlink data transmission over different component carriers in the same sub-frame.

In the embodiments of the invention, an eNB communicates with a specific User Equipment (UE) over component carriers in the carrier aggregation system using a Time Division Duplex (TDD) uplink and downlink sub-frame configuration adopted for a specific component carrier in the carrier aggregation system, where the specific UE is a TDD UE incapable of supporting simultaneous uplink data transmission and downlink data transmission over different component carriers in the same sub-frame, thereby enabling the UE incapable of supporting simultaneous uplink and downlink transmission to communicate data over a plurality of carriers in the carrier aggregation system using different TDD uplink and downlink configurations.

DETAILED DESCRIPTION

Embodiments of the invention provide a data communication method and apparatus in a carrier aggregation system so as to enable a UE incapable of supporting simultaneous uplink and downlink transmission to communicate data in the carrier aggregation system using different TDD uplink and downlink configurations, that is, a technical solution according to the embodiments of the invention enables the UE incapable of supporting simultaneous uplink and downlink transmission to communicate with carrier aggregation in a carrier aggregation scenario using different TDD uplink and downlink configurations across bands.

The embodiments of the invention propose such solutions that a TDD UE incapable of supporting simultaneous uplink and downlink transmission performs communication and a feedback with aggregation when the UE accesses a multi-carrier network using different TDD uplink and downlink configurations. The following description will be given with reference to the drawings.

Figure 5:
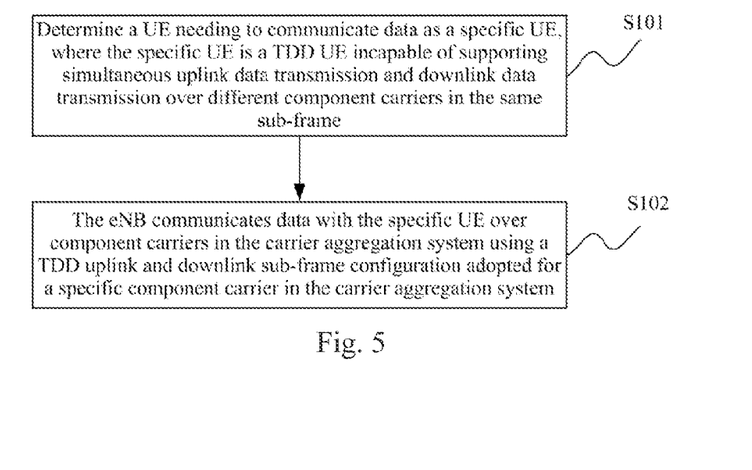
FIG. 5 is a data communication method in a carrier aggregation system according to an embodiment of the invention.

Referring to FIG. 5, a data communication method in a carrier aggregation system at the eNB side according to an embodiment of the invention includes the following steps:

S101. An eNB determines a UE needing to communicate data as a specific UE, where the specific UE is a TDD UE incapable of supporting simultaneous uplink data transmission and downlink data transmission over different component carriers in the same sub-frame.

Preferably the method further includes:

The eNB receives capability information reported from the UE and obtains therefrom an indicator of whether the UE is the specific UE, and determines from the indicator the UE as the specific UE in the step 101.

S102. The eNB communicates data with the specific UE over component carriers in the carrier aggregation system using a Time Division Duplex (TDD) uplink and downlink sub-frame configuration adopted for a specific component carrier in the carrier aggregation system.

Preferably in the step S102, for the specific component carrier, the eNB communicates data with the specific UE over the specific component carrier in the carrier aggregation system using the TDD uplink and downlink sub-frame configuration adopted for the specific component carrier; and For a non-specific component carrier, the eNB communicates data with the specific UE over the non-specific component carrier in the carrier aggregation system using the TDD uplink and downlink sub-frame configuration adopted for the specific component carrier as follows:

The eNB judges whether the non-specific component carrier has the same transmission direction as the specific component carrier in the same sub-frame, and if so, then the eNB determines the sub-frame as an available sub-frame to the non-specific component carrier, otherwise, the eNB determines the sub-frame as an unavailable sub-frame to the non-specific component carrier;

The eNB schedules for the UE an uplink transmission resource corresponding to an uplink available sub-frame and receives data transmitted from the UE over the scheduled uplink transmission resource; and The eNB transmits downlink data to the UE in a downlink available sub-frame.

For example, the UE is configured with carrier aggregation and assigned with a Pcell, and as prescribed, the UE refers to transmission directions of respective sub-frames over a component carrier corresponding to the Pcell, and if the transmission direction of the same sub-frame in a secondary cell (Scell) is different from the Pcell, then the sub-frame in the Scell is ignored for corresponding processing.

Figure 6:
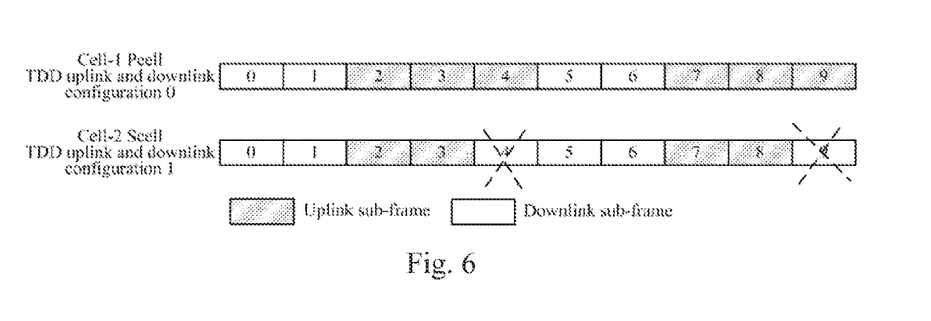
FIG. 6 is a schematic diagram of a UE selecting a sub-frame transmission direction when the cell 1 is a Pcell using the TDD uplink and downlink configuration 0 and the cell 2 is an Scell using the TDD uplink and downlink configuration 1 according to an embodiment of the invention.

Referring to FIG. 6, if the cell 1 is a Pcell and the cell 2 is an Scell, then the UE operates in the Pcell in the sub-frames 4 and 9 which are uplink sub-frames, and ignores reception and processing in the Scell in corresponding downlink sub-frames (including corresponding blind detection of a DL grant and reception of a downlink signal being ignored).

Preferably after the eNB transmits the data to the UE, the method further includes:

The eNB receives uplink (UL) acknowledgement (ACK)/non-acknowledgement (NACK) information transmitted from the UE in an uplink sub-frame of the specific component carrier according to a timing correspondence relationship between data reception over a Physical Downlink Shared Channel (PDSCH) and the UL ACK/NACK information feedback of the specific component carrier.

Preferably the UL ACK/NACK information transmitted from the UE does not include UL ACK/NACK information corresponding to a downlink unavailable sub-frame to the non-specific component carrier.

Still taking FIG. 6 as an example, the UE feeds back UL ACK/NACK by precluding from the size of an ACK/NACK codebook the downlink sub-frame ignored for processing and not feeding back UL ACK/NACK for the downlink sub-frame.

Figure 7:
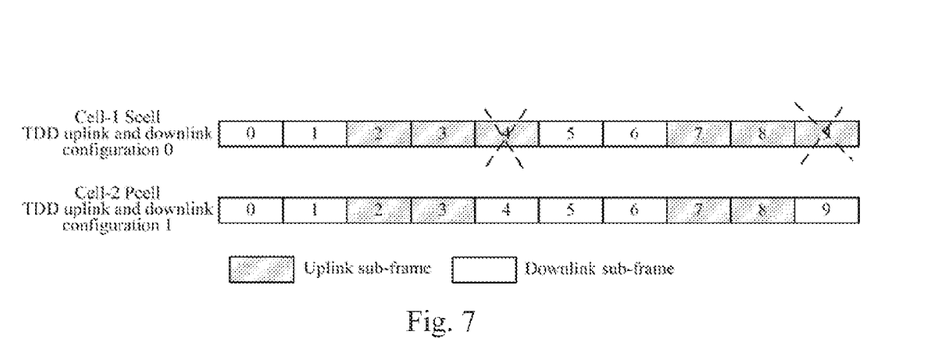
FIG. 7 is a schematic diagram of a UE selecting a sub-frame transmission direction when the cell 1 is an Scell using the TDD uplink and downlink configuration 0 and the cell 2 is a Pcell using the TDD uplink and downlink configuration 1 according to an embodiment of the invention.

On the contrary, referring to FIG. 7, if the cell 1 is an Scell and the cell 2 is a Pcell, then the UE receives and processes in the Pcell in the sub-frames 4 and 9 which are downlink sub-frames and ignores transmission and processing in the Scell in the corresponding uplink sub-frames (including corresponding blind detection of a UL grant and reception of an uplink signal being ignored).

Downlink and uplink data transmission of the Scell here may be scheduled by a DL grant and a UL grant of the Scell itself or be scheduled across the carriers by a DL grant and a UL grant of the PCell.

For example, the specific component carrier is a Pcell carrier, and the UE communicates data over the component carrier in the carrier aggregation system using a TDD uplink and downlink sub-frame configuration of the Pcell. Upon reception of data over a Physical Downlink Shared Channel (PDSCH) in the corresponding downlink sub-frames of the Pcell and the Scell, the UE feeds back corresponding PDSCH ACK/NACK information of the Pcell and the Scell in a corresponding uplink sub-frame in the Pcell according to a timing relationship between the PDSCH and UL ACK/NACK in the Pcell, that is, the UE feeds back corresponding PDSCH ACK/NACK information of the Pcell and the Scell in a corresponding uplink sub-frame over the specific carrier according to UL ACK/NACK timing of the specific carrier.

Figure 8:
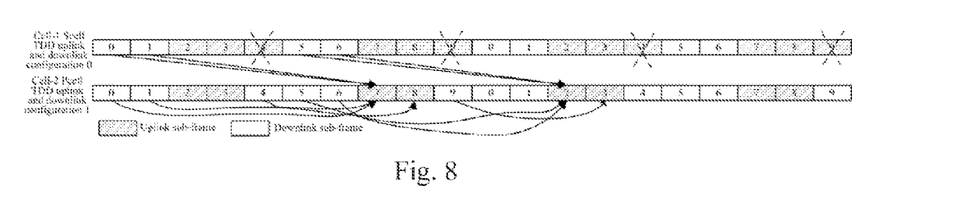
FIG. 8 is a schematic diagram of a UE feeding back UL ACK/NACK when the cell 1 is an Scell using the TDD uplink and downlink configuration 0 and the cell 2 is a Pcell using the TDD uplink and downlink configuration 1 according to an embodiment of the invention.
Figure 9:
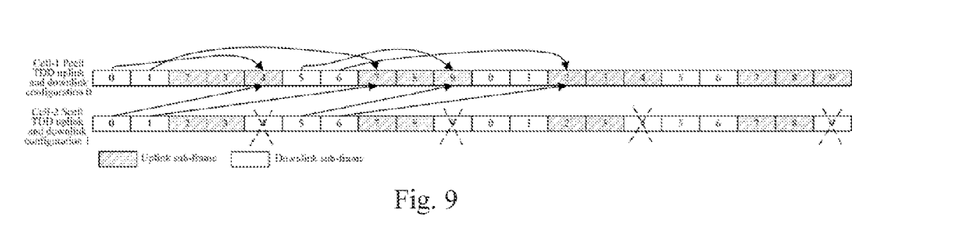
FIG. 9 is a schematic diagram of a UE feeding back UL ACK/NACK when the cell 1 is a Pcell using the TDD uplink and downlink configuration 0 and the cell 2 is an Scell using the TDD uplink and downlink configuration 1 according to an embodiment of the invention.

Referring to FIG. 8 and FIG. 9 illustrating feedback correspondence relationships respectively when the Pcell is configured differently, an arrow represents a PDSCH reception sub-frame pointing to an UL ACK/NACK feedback sub-frame. The PDSCH to UL ACK/NACK timing here is the same as the LTE Rel-8, that is, the timing relationship corresponding to the Pcell may be retrieved in Table 2, where for a forked downlink sub-frame, the UE does not receive and process it and does not feed back corresponding UL ACK/NACK.

Downlink data transmission of the Scell as described in the embodiment of the invention may be scheduled by a DL grant of the Scell itself or may be scheduled across the carriers by a DL grant of the Pcell.

Preferably after the eNB receives the data transmitted from the UE over the scheduled uplink transmission resource, the method further includes:

The eNB transmits downlink (DL) acknowledgement (ACK) or non-acknowledgement (NACK) information to the UE over a Physical Hybrid Automatic Repeat Request (HARQ) Indicator Channel (PHICH) according to a timing correspondence relationship between data transmission over a Physical Uplink Shared Channel (PUSCH) and reception of the DL ACK/NACK information over the PHICH.

Preferably in the case that the secondary cell Scell is not configured with cross-carrier scheduling, the eNB transmits the DL ACK/NACK information to the UE over the PHICH according to the timing correspondence relationship between data transmission over the PUSCH and reception of the DL ACK/NACK information over the PHICH as follows:

The eNB transmits the DL ACK/NACK information to the UE over the PHICH in a downlink sub-frame of the specific component carrier according to a timing correspondence relationship between data transmission over the PUSCH and reception of the DL ACK/NACK information over the PHICH of the specific component carrier; and The eNB transmits the DL ACK/NACK information to the UE over the PHICH in a downlink available sub-frame of the non-specific component carrier according to a timing correspondence relationship between data transmission over the PUSCH and reception of the DL ACK/NACK information over the PHICH of the non-specific component carrier.

Preferably in the case that the secondary cell Scell is configured with cross-carrier scheduling, the eNB transmits the DL ACK/NACK information to the UE over the PHICH according to the timing correspondence relationship between data transmission over the PUSCH and reception of the DL ACK/NACK information over the PHICH as follows:

The eNB transmits the DL ACK/NACK information to the UE over the PHICH only in a downlink sub-frame of the specific component carrier according to a timing correspondence relationship between data transmission over the PUSCH and reception of the DL ACK/NACK information over the PHICH of the specific component carrier.

For example the UE receives the DL ACK/NACK feedback over the corresponding PHICH according to the following timing relationship after transmitting the PUSCH in the corresponding uplink sub-frames of the Pcell and the Scell.

In a first case, if the Scell is not configured with cross-carrier scheduling, that is, PUSCH transmission in the Scell is scheduled by a UL grant of the Scell itself, then the UE receives respective DL ACK/NACK feedbacks of the Pcell and the Scell in the Pcell and the Scell at their respective separate PUSCH to PHICH timings.

Figure 10:
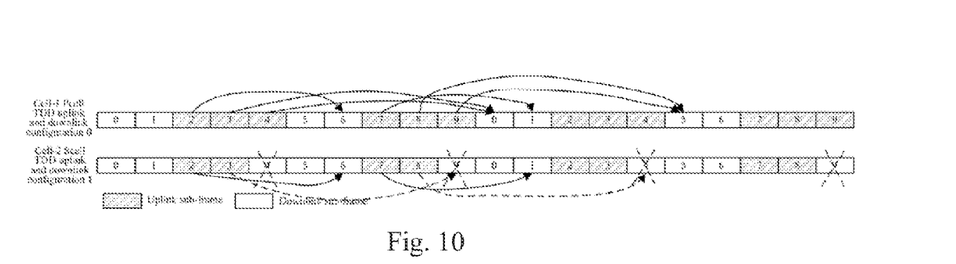
FIG. 10 is a schematic diagram of a UE receiving a PHICH in non-cross-carrier scheduling when the cell 1 is a Pcell using the TDD uplink and downlink configuration 0 and the cell 2 is an Scell using the TDD uplink and downlink configuration 1 according to an embodiment of the invention.

As illustrated in FIG. 10, the direction of an arrow represents a PUSCH transmission sub-frame corresponding to a PHICH feedback sub-frame. The PUSCH to PHICH timing relationship is the same as the LTE Rel-8, that is, the respective timing relationships corresponding to the Pcell and the Scell may be retrieved respectively in Table 3.

It shall be noted that the UE can not receive the PHICH data in the Scell in a downlink sub-frame ignored for processing due to a different transmission direction from the Pcell (e.g., a downlink sub-frame forked in FIG. 10), so transmission of an uplink PUSCH procedure associated therewith may also be influenced, and the eNB may not schedule the PUSCH in these sub-frames; and moreover the eNB may alternatively schedule the PUSCH in these sub-frames but not feed back DL ACK/NACK for these sub-frames.

As illustrated in FIG. 10, the eNB may schedule the PUSCH in the sub-frame 3 of the Scell, and the UE transmits data in the sub-frame 3 of the Scell, but a DL ACK/NACK feedback sub-frame corresponding to the sub-frame 3 of the Scell is the sub-frame 9 of the Scell, and the UE does not process the sub-frame 9 of the Scell, so the eNB does not feed back DL ACK/NACK for the sub-frame 3 of the Scell. Moreover the eNB may alternatively not schedule the PUSCH in the sub-frame 3 of the Scell so that the UE does not transmit data in the sub-frame 3 of the Scell. The same applies to the sub-frame 8 of the Scell and the sub-frame 3 of the Scell.

Figure 11:
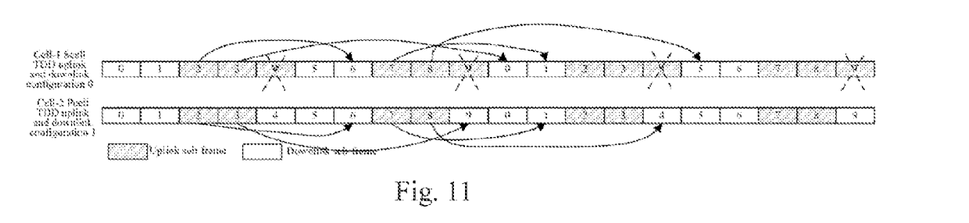
FIG. 11 is a schematic diagram of a UE receiving a PHICH in non-cross-carrier scheduling when the cell 1 is an Scell using the TDD uplink and downlink configuration 0 and the cell 2 is a Pcell using the TDD uplink and downlink configuration 1 according to an embodiment of the invention.

Moreover the UE does not transmit the PUSCH data in the Scell in an uplink sub-frame ignored for processing due to a different transmission direction from the Pcell (e.g., an uplink sub-frame forked in FIG. 11), so the UE does not receive the PHICH data in a corresponding downlink feedback sub-frame either.

In a second case, if the Scell is configured with cross-carrier scheduling, that is, PUSCH transmission in the Scell is scheduled by a UL grant of the Pcell, then the UE receives PUSCH DL ACK/NACK feedbacks for the Pcell and the Scell over the PHICH of the downlink sub-frame of the carrier (i.e., the Pcell) transmitting the UL grant according to the PUSCH to PHICH timing in the Pcell.

Figure 12:
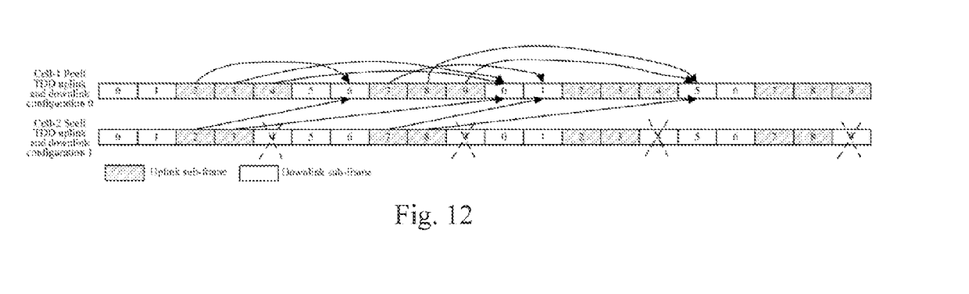
FIG. 12 is a schematic diagram of a UE receiving a PHICH in cross-carrier scheduling when the cell 1 is a Pcell using the TDD uplink and downlink configuration 0 and the cell 2 is an Scell using the TDD uplink and downlink configuration 1 according to an embodiment of the invention.
Figure 13:
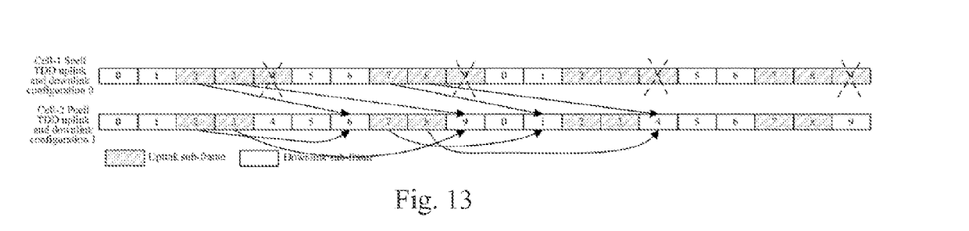
FIG. 13 is a schematic diagram of a UE receiving a PHICH in cross-carrier scheduling when the cell 1 is an Scell using the TDD uplink and downlink configuration 0 and the cell 2 is a Pcell using the TDD uplink and downlink configuration 1 according to an embodiment of the invention.

As illustrated in FIG. 12 and FIG. 13, the direction of an arrow represents a PUSCH transmission sub-frame corresponding to a PHICH feedback sub-frame. The PUSCH to PHICH timing relationship here is the same as the LTE Rel-8, that is, the timing relationship corresponding to the Pcell may be retrieved in Table 3.

It shall be noted that the UE does not transmit the PUSCH data in the Scell in an uplink sub-frame ignored for processing due to a different transmission direction from the Pcell (e.g., an uplink sub-frame forked in FIG. 13), so the UE does not receive the PHICH data in a corresponding downlink feedback sub-frame either.

Preferably the method further includes:

The eNB transmits an indicator of the specific component carrier to the UE.

Preferably the specific component carrier is a component carrier adopted for the primary cell Pcell.

In the embodiment of the invention, the Pcell is preferably referred to, but another component carrier may alternatively be taken as a specific component carrier, that is, a Scell may be referred to, and the sequence number of the reference Scell (or the sequence number of the specific component carrier) may be notified by the eNB to the UE. That is, the UE may receive the indicator of the specific component carrier and determine the specific component carrier from the indicator.

In the foregoing embodiment of the invention, the solution to data communication referring to the Pcell is proposed, but another specific cell can be referred to, and the sequence number of the reference cell can be notified by the eNB to the UE. Moreover in the embodiment of the invention, there is an operating scheme in which the Pcell and the Scell are configured with different TDD uplink and downlink sub-frame configurations, but the technical solution according to the embodiment of the invention can be equally applicable to the case that a plurality of Scells are configured with different TDD uplink and downlink sub-frame configurations and the case that cross-carrier scheduling is configured across Scells.

Correspondingly at the UE side, a data communication method in a carrier aggregation system according to an embodiment of the invention includes:

A User Equipment (UE) communicates data with an eNB over component carriers in the carrier aggregation system using a Time Division Duplex (TDD) uplink and downlink sub-frame configuration adopted for a specific component carrier in the carrier aggregation system;

Where the specific UE is a TDD UE incapable of supporting simultaneous uplink data transmission and downlink data transmission over different component carriers in the same sub-frame.

Preferably for the specific component carrier, the UE communicates data with the eNB over the specific component carrier in the carrier aggregation system using the TDD uplink and downlink sub-frame configuration adopted for the specific component carrier, and For a non-specific component carrier, the UE communicates data with the eNB over the non-specific component carrier in the carrier aggregation system using the TDD uplink and downlink sub-frame configuration adopted for the specific component carrier in the carrier aggregation system as follows:

The UE obtains an uplink transmission resource corresponding to an uplink available sub-frame scheduled by the eNB and transmits data to the eNB over the uplink transmission resource; and The UE receives data transmitted from the eNB in a downlink available sub-frame;

Where the available sub-frame refers to a sub-frame in which the non-specific component carrier has the same transmission direction with the specific component carrier.

Preferably after the UE receives the data transmitted from the eNB, the method further includes:

The UE transmits uplink (UL) acknowledgement (ACK)/non-acknowledgement (NACK) information to the eNB in an uplink sub-frame of the specific component carrier according to a timing correspondence relationship between data reception over a Physical Downlink Shared Channel (PDSCH) and the UL ACK/NACK information feedback of the specific component carrier.

Preferably the UL ACK/NACK information transmitted from the UE does not include UL ACK/NACK information corresponding to a downlink unavailable sub-frame of the non-specific component carrier;

Where the unavailable sub-frame refers to a sub-frame in which the non-specific component carrier has a different transmission direction from the specific component carrier.

Preferably after the UE transmits the data to the eNB over the uplink transmission resource scheduled by the eNB, the method further includes:

The UE receives downlink (DL) acknowledgement (ACK) or non-acknowledgement (NACK) transmitted from the eNB over a Physical Hybrid Automatic Repeat Request (HARQ) Indicator Channel (PHICH) according to a timing correspondence relationship between data transmission over a Physical Uplink Shared Channel (PUSCH) and reception of the DL ACK/NACK information over the PHICH.

Preferably in the case that a secondary cell Scell is not configured with cross-carrier scheduling, the UE receives the DL ACK/NACK transmitted from the eNB over the PHICH according to the timing correspondence relationship between data transmission over the PUSCH and reception of the DL ACK/NACK information over the PHICH as follows:

The UE receives the DL ACK/NACK information over the PHICH in a downlink sub-frame of the specific component carrier according to a timing correspondence relationship between data transmission over the PUSCH and reception of the DL ACK/NACK information over the PHICH over the specific component carrier; and The UE receives the DL ACK/NACK information over the PHICH in a downlink available sub-frame of the non-specific component carrier according to a timing correspondence relationship between data transmission over the PUSCH and reception of the DL ACK/NACK information over the PHICH of the non-specific component carrier.

Preferably in the case that a secondary cell Scell is configured with cross-carrier scheduling, the UE receives the DL ACK/NACK information transmitted from the eNB over the PHICH according to the timing correspondence relationship between data transmission over the PUSCH and reception of the DL ACK/NACK information over the PHICH as follows:

The UE receives the DL ACK/NACK information over the PHICH only in a downlink sub-frame of the specific component carrier according to a timing correspondence relationship between data transmission over the PUSCH and reception of the DL ACK/NACK information over the PHICH of the specific component carrier.

Preferably the method further includes:

The UE receives an indicator of the specific component carrier transmitted from the eNB and determines the specific component carrier from the indicator.

Preferably the specific component carrier is a component carrier adopted for a primary cell Pcell.

Preferably the method further includes:

The UE reports capability information of the UE to the eNB, where the capability information includes an indicator of whether the UE is a specific UE.

Figure 14:
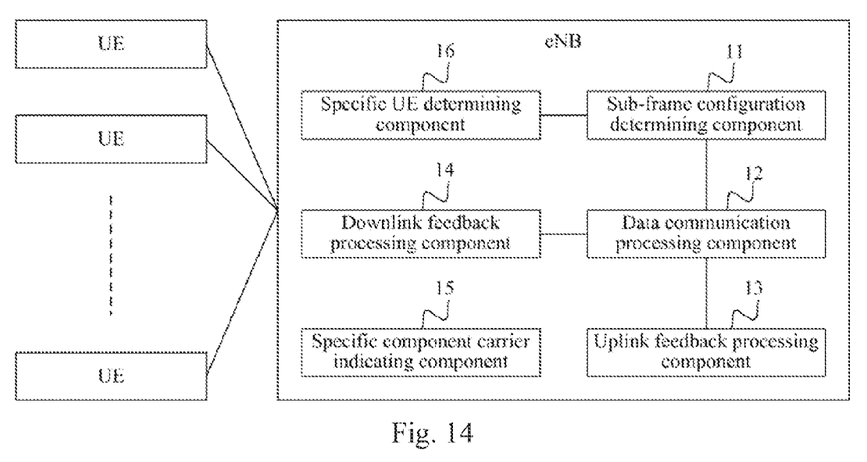
FIG. 14 is a schematic structural diagram of a data communication apparatus in a carrier aggregation system according to an embodiment of the invention.

Referring to FIG. 14, a data communication apparatus in a carrier aggregation system at the eNB side includes:

A sub-frame configuration determining component 11 configured to determine a Time Division Duplex (TDD) uplink and downlink sub-frame configuration adopted for a specific component carrier in the carrier aggregation system; and A data communication processing component 12 configured to communicate data with a specific User Equipment (UE) over component carriers in the carrier aggregation system using the Time Division Duplex (TDD) uplink and downlink sub-frame configuration adopted for the specific component carrier in the carrier aggregation system;

Where the specific UE is a UE incapable of supporting simultaneous uplink data transmission and downlink data transmission over different component carriers in the same sub-frame.

Preferably,

For the specific component carrier, the data communication processing component 12 communicates data with the specific UE over the specific component carrier in the carrier aggregation system using the TDD uplink and downlink sub-frame configuration adopted for the specific component carrier; and For a non-specific component carrier, the data communication processing component 12 judges whether the non-specific component carrier has the same transmission direction as the specific component carrier in the same sub-frame, and if so, then it determines the sub-frame as an available sub-frame to the non-specific component carrier, otherwise, it determines the sub-frame as an unavailable sub-frame to the non-specific component carrier; schedules for the UE an uplink transmission resource corresponding to an uplink available sub-frame and receives data transmitted from the UE over the scheduled uplink transmission resource; and transmits downlink data to the UE in a downlink available sub-frame.

Preferably the apparatus further includes:

An uplink feedback processing component 13 configured to receive uplink (UL) acknowledgement (ACK)/non-acknowledgement (NACK) information transmitted from the UE in an uplink sub-frame of the specific component carrier according to a timing correspondence relationship between data reception over a Physical Downlink Shared Channel (PDSCH) and the UL ACK/NACK information feedback of the specific component carrier after the data communication processing component 12 transmits the data to the UE.

Preferably the UL ACK/NACK information, received by the uplink feedback processing component 13, transmitted from the UE does not include UL ACK/NACK information corresponding to a downlink unavailable sub-frame to the non-specific component carrier.

Preferably the apparatus further includes:

A downlink feedback processing component 14 configured to transmit downlink (DL) acknowledgement (ACK) or non-acknowledgement (NACK) information to the UE over a Physical Hybrid Automatic Repeat Request (HARQ) Indicator Channel (PHICH) according to a timing correspondence relationship between data transmission over a Physical Uplink Shared Channel (PUSCH) and reception of the DL ACK/NACK information over the PHICH after the data communication processing component 12 receives the data transmitted from the UE over the scheduled uplink transmission resource.

Preferably in the case that a secondary cell Scell is not configured with cross-carrier scheduling, the downlink feedback processing component 14 transmits the DL ACK/NACK information to the UE over the PHICH in a downlink sub-frame of the specific component carrier according to a timing correspondence relationship between data transmission over the PUSCH and reception of the DL ACK/NACK information over the PHICH of the specific component carrier; and transmits the DL ACK/NACK information to the UE over the PHICH in a downlink available sub-frame of the non-specific component carrier according to a timing correspondence relationship between data transmission over the PUSCH and reception of the DL ACK/NACK information over the PHICH of the non-specific component carrier.

Preferably in the case that a secondary cell Scell is configured with cross-carrier scheduling, the downlink feedback processing component 14 transmits the DL ACK/NACK information to the UE over the PHICH only in a downlink sub-frame of the specific component carrier according to a timing correspondence relationship between data transmission over the PUSCH and reception of the DL ACK/NACK information over the PHICH of the specific component carrier.

Preferably the apparatus further includes:

A specific component carrier indicating component 15 configured to transmit an indicator of the specific component carrier to the UE.

Preferably the specific component carrier is a component carrier adopted for a primary cell Pcell.

Preferably the apparatus further includes:

A specific UE determining component 16 configured to receive capability information reported from the UE, to obtain therefrom an indicator of whether the UE is a specific UE and to determine from the indicator the UE as a specific UE.

Figure 15:
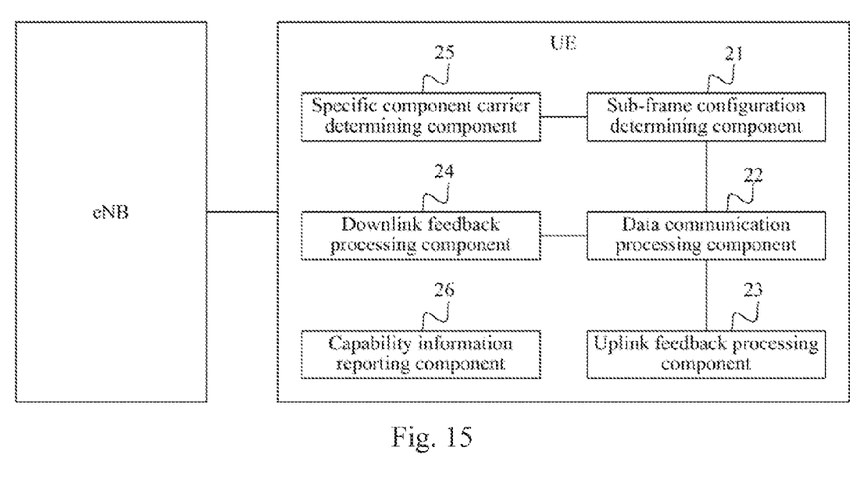
FIG. 15 is a schematic structural diagram of another data communication apparatus in a carrier aggregation system according to an embodiment of the invention.

Referring to FIG. 15, a data communication apparatus in a carrier aggregation system at the UE side includes:

A sub-frame configuration determining component 21 configured to determine a Time Division Duplex (TDD) uplink and downlink sub-frame configuration adopted for a specific component carrier in the carrier aggregation system; and A data communication processing component 22 configured to communicate data with an eNB over component carriers in the carrier aggregation system using the Time Division Duplex (TDD) uplink and downlink sub-frame configuration adopted for the specific component carrier in the carrier aggregation system;

Where the specific UE is a UE incapable of supporting simultaneous uplink data transmission and downlink data transmission over different component carriers in the same sub-frame.

Preferably,

For the specific component carrier, the data communication processing component 22 communicates data with the eNB over the specific component carrier in the carrier aggregation system using the TDD uplink and downlink sub-frame configuration adopted for the specific component carrier; and For a non-specific component carrier, the data communication processing component 22 obtains an uplink transmission resource corresponding to an uplink available sub-frame scheduled by the eNB and transmits data to the eNB over the uplink transmission resource; and receives data transmitted from the eNB in a downlink available sub-frame;

Where the available sub-frame refers to a sub-frame in which the non-specific component carrier has the same transmission direction as the specific component carrier.

Preferably the apparatus further includes:

An uplink feedback processing component 23 configured to transmit uplink (UL) acknowledgement (ACK)/non-acknowledgement (NACK) information to the eNB in an uplink sub-frame of the specific component carrier according to a timing correspondence relationship between data reception over a Physical Downlink Shared Channel (PDSCH) and the UL ACK/NACK information feedback of the specific component carrier after the data communication processing component receives the data transmitted from the eNB.

Preferably the UL ACK/NACK information transmitted from the uplink feedback processing component 23 does not include UL ACK/NACK information corresponding to a downlink unavailable sub-frame of the non-specific component carrier;

Where the unavailable sub-frame refers to a sub-frame in which the non-specific component carrier has a different transmission direction from the specific component carrier.

Preferably the apparatus further includes:

A downlink feedback processing component 24 configured to receive downlink (DL) acknowledgement (ACK) or non-acknowledgement (NACK) information transmitted from the eNB over a Physical Hybrid Automatic Repeat Request (HARQ) Indicator Channel (PHICH) according to a timing correspondence relationship between data transmission over a Physical Uplink Shared Channel (PUSCH) and reception of the DL ACK/NACK information over the PHICH after the data communication processing component 22 transmits the data to the eNB over the uplink transmission resource scheduled by the eNB.

Preferably in the case that a secondary cell Scell is not configured with cross-carrier scheduling, the downlink feedback processing component 24 receives the DL ACK/NACK information over the PHICH in a downlink sub-frame of the specific component carrier according to a timing correspondence relationship between data transmission over the PUSCH and reception of the DL ACK/NACK information over the PHICH of the specific component carrier; and receives the DL ACK/NACK information over the PHICH in a downlink available sub-frame of the non-specific component carrier according to a timing correspondence relationship between data transmission over the PUSCH and reception of the DL ACK/NACK information over the PHICH of the non-specific component carrier.

Preferably in the case that a secondary cell Scell is configured with cross-carrier scheduling, the downlink feedback processing component 24 receives the DL ACK/NACK information over the PHICH only in a downlink sub-frame of the specific component carrier according to a timing correspondence relationship between data transmission over the PUSCH and reception of the DL ACK/NACK information over the PHICH of the specific component carrier.

Preferably the apparatus further includes:

A specific component carrier determining component 25 configured to receive an indicator of the specific component carrier transmitted from the eNB and to determine the specific component carrier from the indicator.

Preferably the specific component carrier is a component carrier adopted for a primary cell Pcell.

Preferably the apparatus further includes:

A capability information reporting component 26 configured to report capability information of the UE to the eNB, where the capability information includes an indicator of whether the UE is a specific UE.

In summary, in the embodiments of the invention, the UE decides the use of the uplink and downlink sub-frames of the respective component carriers according to the transmission direction of the specific component carrier; the UE decides UL ACK/NACK feedbacks over the respective component carriers according to a timing relationship between the PDSCH and the UL ACK/NACK of the specific component carrier; and the UE decides a scheme to receive a PHICH over the respective component carriers according to a timing relationship between the PDSCH and the UL ACK/NACK of the specific component carrier. The solution to transmission of uplink and downlink data with carrier aggregation and the corresponding feedback solution are proposed for a TDD UE incapable of supporting simultaneous uplink and downlink transmission when the UE accesses a multi-carrier network using different TDD uplink and downlink configurations.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A data communication method in a carrier aggregation system comprising:
   an eNB communicating data with a specific User Equipment, UE, over component carriers in the carrier aggregation system using a Time Division Duplex, TDD, uplink and downlink sub-frame configuration adopted for a specific component carrier in the carrier aggregation system,
   wherein the eNB determined that the specific UE is a TDD UE incapable of supporting simultaneous uplink data transmission and downlink data transmission over different component carriers in a same sub-frame;
   and wherein for the specific component carrier, the eNB communicates data with the specific UE over the specific component carrier in the carrier aggregation system, based on the determination, using the TDD uplink and downlink sub-frame configuration adopted for the specific component carrier; and
   for a non-specific component carrier, the eNB communicates data with the specific UE over the non-specific component carrier in the carrier aggregation system, based on the determination, using the TDD uplink and downlink sub-frame configuration adopted for the specific component carrier as follows:
   the eNB judging whether the non-specific component carrier has a same transmission direction as the specific component carrier in the same sub-frame, and if so, then determining the sub-frame as an available sub-frame of the non-specific component carrier; otherwise, determining the sub-frame as an unavailable sub-frame of the non-specific component carrier;
   the eNB scheduling for the UE an uplink transmission resource corresponding to an uplink available sub-frame and receiving data transmitted from the UE over the scheduled uplink transmission resource; and
   the eNB transmitting downlink data to the UE in a downlink available sub-frame.

2. The method of claim 1, wherein after the eNB transmits the data to the UE, the method further comprises:
   the eNB receiving uplink, UL, acknowledgement, ACK/non-acknowledgement, NACK, information transmitted from the UE in an uplink sub-frame of the specific component carrier according to a timing correspondence relationship between data reception over a Physical Downlink Shared Channel, PDSCH and feedback of the UL ACK/NACK information of the specific component carrier.

3. The method of claim 2, wherein the UL ACK/NACK information transmitted from the UE does not comprise UL ACK/NACK information corresponding to a downlink unavailable sub-frame of the non-specific component carrier.

4. The method of claim 1, wherein after the eNB receives the data transmitted from the UE over the scheduled uplink transmission resource, the method further comprises:
   the eNB transmitting downlink, DL, ACK/NACK information to the UE over a Physical Hybrid Automatic Repeat Request, HARQ, Indicator Channel, PHICH, according to a timing correspondence relationship between data transmission over a Physical Uplink Shared Channel, PUSCH, and reception of the DL ACK/NACK information over the PHICH.

5. The method of claim 4, wherein in a case that a secondary cell, Scell, is a non-specific component carrier and not configured with cross-carrier scheduling, the eNB transmitting the DL ACK/NACK information to the UE over the PHICH according to the timing correspondence relationship between data transmission over the PUSCH and reception of the DL ACK/NACK information over the PHICH comprises:
   the eNB transmitting the DL ACK/NACK information to the UE over the PHICH in a downlink sub-frame of the specific component carrier according to a timing correspondence relationship between data transmission over the PUSCH and reception of the DL ACK/NACK information over the PHICH of the specific component carrier; and
   the eNB transmitting the DL ACK/NACK information to the UE over the PHICH in a downlink available sub-frame of the non-specific component carrier according to a timing correspondence relationship between data transmission over the PUSCH and reception of the DL ACK/NACK information over the PHICH of the non-specific component carrier.

6. The method of claim 4, wherein in a case that a Scell is a non-specific component carrier and configured with cross-carrier scheduling, the eNB transmitting the DL ACK/NACK information to the UE over the PHICH according to the timing correspondence relationship between data transmission over the PUSCH and reception of the DL ACK/NACK information over the PHICH comprises:
   the eNB transmitting the DL ACK/NACK information to the UE over the PHICH only in a downlink sub-frame of the specific component carrier according to a timing correspondence relationship between data transmission over the PUSCH and reception of the DL ACK/NACK information over the PHICH of the specific component carrier.

7. The method of claim 1, further comprising:
   the eNB transmitting an indicator of the specific component carrier to the UE.

8. The method of claim 1, wherein the specific component carrier is a component carrier adopted for a primary cell, Pcell.

9. The method of claim 1, further comprising:
   the eNB receiving capability information reported from the UE, obtaining from the capability information an indicator of whether the UE is the specific UE, and determining from the indicator the UE as the specific UE.

10. A data communication method in a carrier aggregation system comprising:
    a User Equipment, UE, communicating data with an eNB over component carriers in the carrier aggregation system using a Time Division Duplex, TDD, uplink and downlink sub-frame configuration adopted for a specific component carrier in the carrier aggregation system,
    wherein the eNB determines that the specific UE is a TDD UE incapable of supporting simultaneous uplink data transmission and downlink data transmission over different component carriers in a same sub-frame;
    and wherein for the specific component carrier, the UE communicates data with the eNB over the specific component carrier in the carrier aggregation system, based on the eNB's determination, using the TDD uplink and downlink sub-frame configuration adopted for the specific component carrier; and for a non-specific component carrier, the UE communicates data with the eNB over the non-specific component carrier in the carrier aggregation system, based on the eNB's determination, using the TDD uplink and downlink sub-frame configuration adopted for the specific component carrier in the carrier aggregation system as follows:

the UE obtaining an uplink transmission resource corresponding to an uplink available sub-frame scheduled by the eNB and transmitting data to the eNB over the uplink transmission resource; and the UE receiving data transmitted from the eNB in a downlink available sub-frame;

wherein the available sub-frames refer to sub-frames in which the non-specific component carrier has a same transmission direction as the specific component carrier.

11. The method of claim 10, wherein after the UE receives the data transmitted from the eNB, the method further comprises:

the UE transmitting UL ACK/NACK information to the eNB in an uplink sub-frame of the specific component carrier according to a timing correspondence relationship between data reception over a PDSCH and feedback of the UL ACK/NACK information of the specific component carrier.

12. The method of claim 11, wherein the UL ACK/NACK information transmitted from the UE does not comprise UL ACK/NACK information corresponding to a downlink unavailable sub-frame of the non-specific component carrier;

wherein the unavailable sub-frame refers to a sub-frame in which the non-specific component carrier has a different transmission direction from the specific component carrier.

13. The method of claim 10, wherein after the UE transmits the data to the eNB over the scheduled uplink transmission resource scheduled by the eNB, the method further comprises:

the UE receiving DL ACK/NACK information transmitted from the eNB over a PHICH according to a timing correspondence relationship between data transmission over a PUSCH and reception of the DL ACK/NACK information over the PHICH.

14. The method of claim 13, wherein in a case that a Scell is a non-specific component carrier and not configured with cross-carrier scheduling, the UE receiving the DL ACK/NACK information transmitted from the eNB over the PHICH according to the timing correspondence relationship between data transmission over the PUSCH and reception of the DL ACK/NACK information over the PHICH comprises:

the UE receiving the DL ACK/NACK information over the PHICH in a downlink sub-frame of the specific component carrier according to a timing correspondence relationship between data transmission over the PUSCH and reception of the DL ACK/NACK information over the PHICH of the specific component carrier; and the UE receiving the DL ACK/NACK information over the PHICH in a downlink available sub-frame of the non-specific component carrier according to a timing correspondence relationship between data transmission over the PUSCH and reception of the DL ACK/NACK information over the PHICH of the non-specific component carrier.

15. The method of claim 13, wherein in a case that a Scell is a non-specific component carrier and configured with cross-carrier scheduling, the UE receiving the DL ACK/NACK information transmitted from the eNB over the PHICH according to the timing correspondence relationship between data transmission over the PUSCH and reception of the DL ACK/NACK information over the PHICH comprises:

the UE receiving the DL ACK/NACK information over the PHICH only in a downlink sub-frame of the specific component carrier according to a timing correspondence relationship between data transmission over the PUSCH and reception of the DL ACK/NACK information over the PHICH of the specific component carrier.

16. The method of claim 10, further comprising:

the UE receiving an indicator of the specific component carrier transmitted from the eNB and determining the specific component carrier from the indicator.

17. The method of claim 10, wherein the specific component carrier is a component carrier adopted for a Pcell.

18. The method of claim 10, further comprising:

the UE reporting capability information of the UE to the eNB, wherein the capability information comprises an indicator of whether the UE is the specific UE.

19. A data communication apparatus in a carrier aggregation system comprising:

a sub-frame configuration determining component configured to determine a TDD uplink and downlink sub-frame configuration adopted for a specific component carrier in the carrier aggregation system; and a data communication processing component configured to communicate data with an eNB over component carriers in the carrier aggregation system using the TDD uplink and downlink sub-frame configuration adopted for the specific component carrier in the carrier aggregation system;

wherein the eNB determines that the specific UE is a UE incapable of supporting simultaneous uplink data transmission and downlink data transmission over different component carriers in a same sub-frame; and wherein:

for the specific component carrier, the data communication processing component communicates data with the eNB over the specific component carrier in the carrier aggregation system, based on the eNB's determination, using the TDD uplink and downlink sub-frame configuration adopted for the specific component carrier; and for a non-specific component carrier, the data communication processing component obtains, based on the eNB's determination, an uplink transmission resource corresponding to an uplink available sub-frame scheduled by the eNB and transmits data to the eNB over the uplink transmission resource; and receives data transmitted from the eNB in a downlink available sub-frame;

wherein the available sub-frames refer to sub-frames in which the non-specific component carrier has a same transmission direction as the specific component carrier.

20. The apparatus of claim 19, further comprising:

an uplink feedback processing component configured to transmit UL ACK/NACK information to the eNB in an uplink sub-frame of the specific component carrier according to a timing correspondence relationship between data reception over a PDSCH and feedback of the UL ACK/NACK information of the specific component carrier after the data communication processing component receives the data transmitted from the eNB; and/or a downlink feedback processing component configured to receive DL ACK/NACK information transmitted from the eNB over a PHICH according to a timing correspondence relationship between data transmission over a PUSCH and reception of the DL ACK/NACK information over the PHICH after the data communication processing component transmits the data to the eNB over the uplink transmission resource scheduled by the eNB.

* * * * *